3,289,689
VALVE ASSEMBLY
Hiroto Kobayashi and Kosaku Aibara, Kawasaki, Japan, assignors to Kabushiki Kaisha Keihin Seiki Seisakusho, Kawasaki, Japan, a corporation of Japan
Filed Dec. 28, 1965, Ser. No. 517,023
3 Claims. (Cl. 137—221)

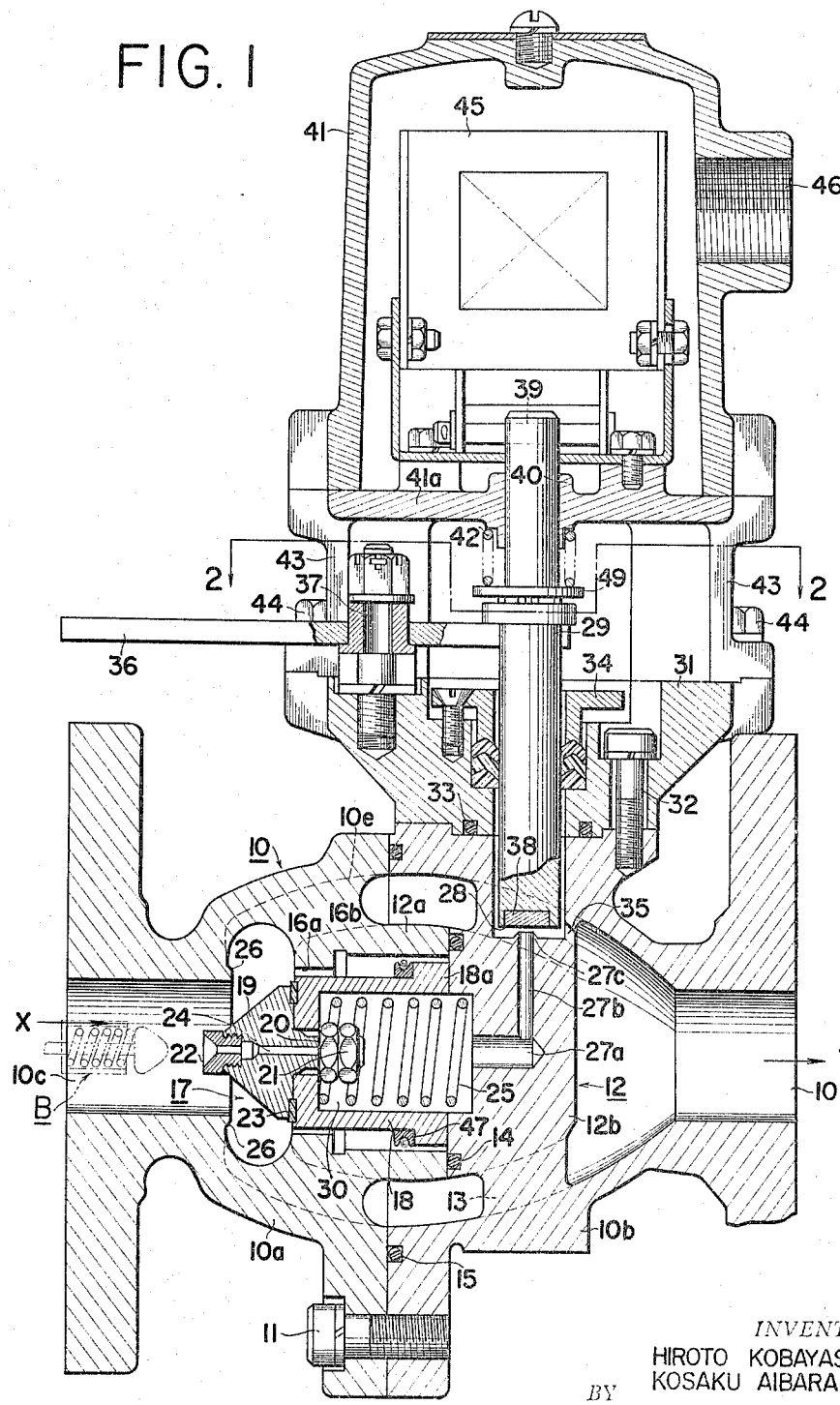

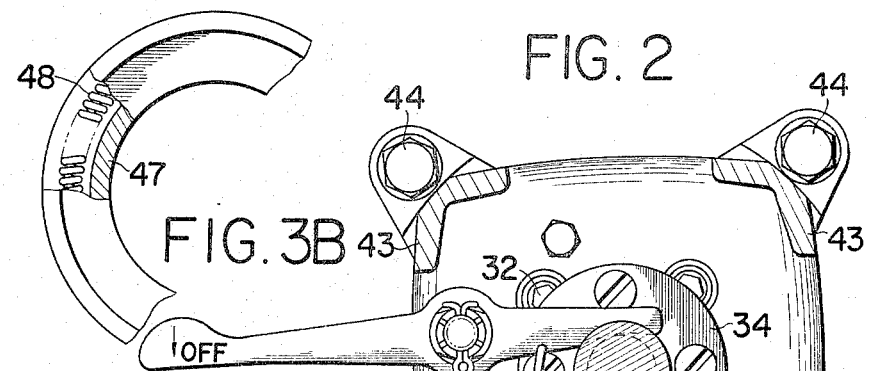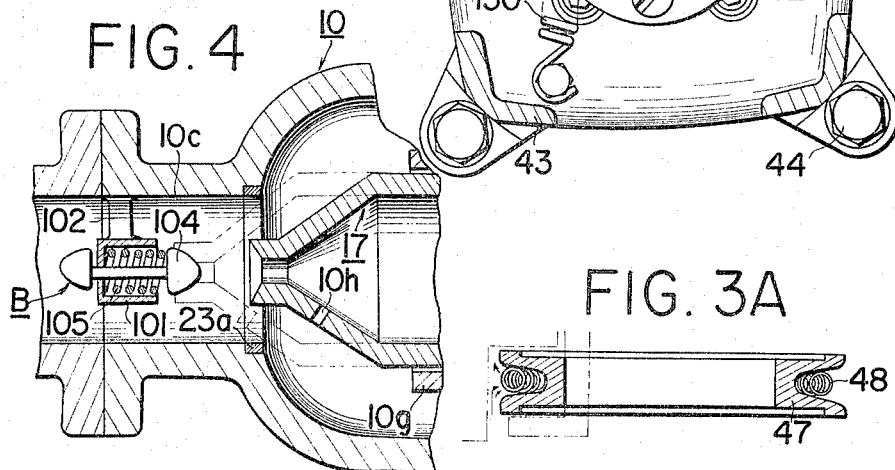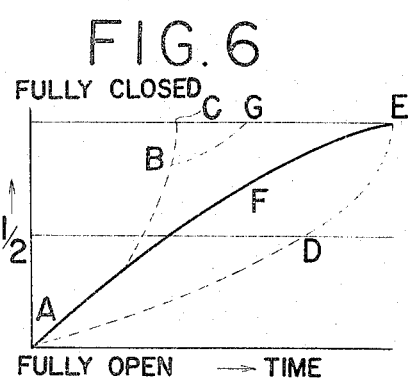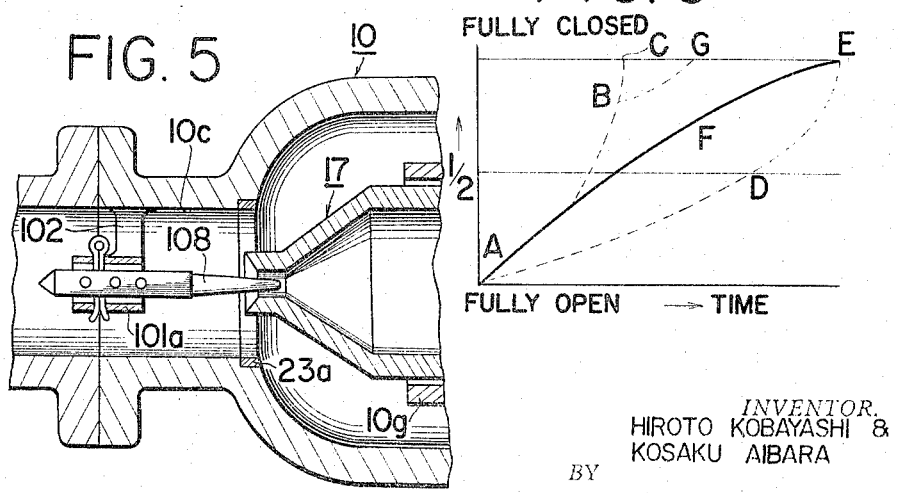

This application is a continuation-in-part application of U.S. Serial No. 249,417 filed January 4, 1963.

This invention relates broadly to valve assemblies and more specifically to pilot-operated fluid shut-off, flow control valves, wherein a valve piston is subjected to a pressure difference between the main upstream and a pilot stream branched off therefrom and the latter stream is controlled by a pilot wave. Such a conventional valve assembly is generally so constructed that the main flow is completely shut-off when the pilot valve is closed to cease the pilot stream. Flow control feature can be also obtained when the pilot valve is made in the form of a flow control valve. The back pressure acting upon the main valve piston exerted by the pilot fluid pressure is generally assisted by spring means generally in the form of a coil.

According to the conventional technique, the piston is kept generally in fluid tight relation with the cooperating cylinder by means of a plurality of sealing rings or by fabricating the piston precisely, such as by polishing the latter to the desired dimensions for preventing possible leakage between the piston and the cylinder. Such a fluid tight cooperation requires naturally a large amount of effort to be exerted upon the piston for closing the latter, and the pilot valve must be designed correspondingly larger. When the pilot valve is solenoid-controlled, the required electrical power will become large, which means that a correspondingly large size solenoid coil is required and larger overall sizes of the valve assembly will result. If the pilot valve is operated by a float, in the case of the fluid level control valve, the size of the float must also be designed correspondingly large.

A considerable and grave drawback inherent in the conventional pilot-operated valve is that caused by the fluid hammer which takes place upon closure of the main valve.

It is therefore an object of the present invention to provide a pilot-operated valve of which the valve piston is movable in its closing direction with a considerably reduced effort in comparison with conventional valves.

Another object of the invention is to provide an improved pilot-operated valve, capable of minimizing fluid hammer shocks which are commonly met upon sudden closure of the valve.

Another object is to provide an improved pilot-operated valve of which the valve piston and the cooperating cylinder may be fabricated in their preciseness more roughly than conventional.

In addition to the provision of a considerable play between the valve piston and the cooperating cylinder according to the invention, there is provided efficient and resilient sealing means for the main valve as well as the aforementioned leaking gap between the valve piston and the cylinder.

Another object of the present invention is therefore to provide an improved pilot-operated valve which assures smooth, bubble-tight and drip-proof closing thereof.

A further object is to provide an improved pilot-operated valve of the kind above referred to, which is rugged, and of simple construction, having few moving parts to insure long life and maintenance-free operation.

These and other objects of the invention will be more apparent to those skilled in the art from a consideration of the following detailed description when taken together with the accompanying drawings in which:

FIG. 1 represent a general longitudinal section of a a pilot-operated, solenoid-controlled shut-off valve embodying the principles of the invention;

FIG. 2 represents a horizontal section taken on a plane 2—2 in FIG. 1;

FIGS. 3A and 3B are a sectional view and a top plan view of a sealing ring employable in the above-illustrated valve, respectively;

FIG. 4 is a longitudinal section through part of the improved valve assembly, wherein buffering means provided in front of the head of the main valve piston so as to suppress possible fluid hammer when closing the valve are specifically illustrated;

FIG. 5 is a similar view to FIG. 4 showing especially a pin type buffering means cooperating with the nozzle opening in the main valve piston so as to buffer possible fluid hammer from taking place; and FIG. 6 is a diagram showing buffering effects obtainable with use of the aforementioned buffering means shown in FIGS. 4 and 5 respectively.

Now referring to FIGS. 1–2, an embodiment of the invention will be described in detail hereinbelow:

10 denotes generally a two-piece valve body or casing comprising two separate casing elements 10a and 10b, which are detachably united together by means of a plurality of fixing bolts 11, of which only one is illustrated in FIG. 1. Centrally within the interior of the valve body assembly 10, there is provided a core piece 12 rigidly fixed with the casing wall by means of a plurality of radial ribs 13 cast integral therewith. The core piece 12 is in practice divided into two elements as at 12a and 12b. For insuring a fluid tight connection between the confronting surfaces of these elements, an O-ring 14 is provided as conventionally.

In the similar way, a further O-ring 15 is provided for establishing a sufficient seal between the confronting surfaces of the casing elements 10a and 10b. The casing elements 10a and 10b are formed with inlet and outlet passages 10c and 10d, respectively, said passages being connected with each other by means of a ring passage 10e as indicated by dotted lines in FIG. 1. The core 12a is formed centrally with a stepped bore comprising a reduced portion 16a and an enlarged portion 16b, which bore is closed by the front wall surface of the other core element 12b A valve member generally denoted by 17 passes loosely through the said reduced portion or opening 16a with a considerable diametrical play such as, for instance, about 0.2 mm. or larger for 50 mm$\phi$ (2") valve, extending into the enlarged core chamber 16b. The diametrical gap will be reduced to about 0.06 mm. for 15.77 mm$\phi$ (½") valve. As shown, the valve member is divided into three elements, that is, a hollow cylindrical element 18 having a radial flange 18a at its downstream end; a cone piece 19 detachably fixed with the last mentioned element 18 by means of nuts 20–21; and a nozzle piece 22 screwed in the cone at its apex. A resilient sealing ring 23 is provided between the mating surfaces of said members 18 and 19, and a narrow fluid passage 24 extends through nozzle- and cone pieces 22 and 19 and opens in the cylindrical innermost chamber 30. A coil spring 25 is contained within the chamber 30 so as to urge resiliently the thus formed valve member assembly towards a valve seat 26 formed on the downstream end of the inlet passage 10c. Valve seat 26 is adapted to cooperate with part of sealing ring 23, as will be more fully described hereinafter. An angular fluid outlet passage 27a–27b is drilled through the downstream core element 12b, and terminates into an enlarged vertical bore 28, in which a plunger 29 extends.

This plunger is slidably guided in a mounting member or bonnet 31, which is detachably bolted to the uppermost flat surface of the downstream valve casing element 10b by means of a plurality of fixing bolts 32, only one of the latter is seen in FIG. 1. For sealing connection between the mating surfaces of casing element 10b and mounting member 31, O-ring 33 is provided, and in addition, for sealingly guiding the plunger, a gland assembly generally denoted by 34 is provided in the mounting member. The lower end of the enlarged bore 28 is open to the main fluid passage of the valve as at 35. A control lever 36 is pivotally mounted on the member 31 about a pivot 37, which is screwed therein, while the plunger is formed at its top end with an enlarged head and the free end of control lever is normally kept in engagement with the lower surface of the plunger head. In this position, the lower end of the plunger is kept in separation a predetermined distance from the bottom of bore 28, so that outlet passage 27 is in communication with the main valve passage 10c–e–d. In the bottom end of plunger 29, a resilient disc 38, preferably made from synthetic substance, such as, for instance, nylon, Teflon, Buna or the like, is embedded and adapted to cooperate with a valve seat 27c formed around the uppermost end of fluid passage 27b. Sealing means 23 may be made from a substance as above listed.

The plunger 29 has an integral extension 39, which is slidably mounted in a boss 40 formed integral with the bottom wall 41a of a coil cover casing 41 and urged by a coil spring 42 tensioned between a collar 49, on the one hand, which is formed on an intermediate portion of the plunger, and the bottom surface of the cover casing, on the other hand. The cover is provided with a plurality of depending legs 43, which are rigidly, yet detachably fixed on the upper surface of mounting member 31 by means of bolts 44. The cover casing contains therein a solenoid coil 45 shown only schematically. Although not shown, the solenoid is electrically connected to a current source by means of suitable leads (not shown), which are inserted from outside through a socket 46, formed in the cover wall as conventionally.

For the purpose which will become clear as the description proceeds, a sealing ring 47 is mounted around the periphery of the cylindrical element 18 and abuts upon the flange 18a.

This sealing ring, illustrated more fully in FIGS. 3A and 3B, is preferably made of suitable synthetic substance, such as, for instance, nylon, Teflon, Buna or the like. This ring has a V peripheral groove as shown and is provided with a pressure member in the form of coiled spring 48, which may be dispensed with, if necessary.

The valve assembly is further provided with a shock-buffering means generally shown in FIG. 1 by reference symbol B and with an imaginary line illustrating only the outline of the means for avoiding possible confusion with other parts of the valve assembly.

In FIG. 4, the buffering means B effectively at the closing operation of the valve is shown more specifically. In this figure, however, the valve body 10 and the valve member 17 are illustrated only schematically and thus in a somewhat different manner, for the purpose of showing the basic construction of the valve. Further, in this figure, the part of the valve body 10 which defines the reduced opening 16a shown in FIG. 1 is illustrated for simplification as if it be an independent sleeve 10g. Still further, in FIG. 4 sealing ring 23 shown in FIG. 1 as fixedly mounted on valve member 17 has been omitted and instead a resilient ring 23a is fixedly mounted on the part of valve body 10 which corresponds to valve seat 26 shown in FIG. 1. In the wall of the cone part of the valve member, a communicating passage 10h may preferably be provided.

As shown in FIG. 4, a stationary sleeve 101 is fixedly mounted by a rib 102 extending from the inlet opening 10c of the valve body 10 in front of resilient valve seat 23a. A double headed buffer member 104 is resiliently supported through the intermediary of a coil spring 105 by the sleeve 101.

In a modification shown in FIG. 5, the double headed member 104 described in connection with FIG. 4 has been replaced by an elongated flow control pin 108 fixedly mounted in sleeve 101a.

The valve assembly described so far is constructed as an on-off valve, and operates as follows:

A fluid, such as pressurized air, steam, vapor, water, oil or the like, is conveyed from an inlet piping (not shown) rigidly bolted to the lefthand side flange (FIG. 1), to inlet passage 10c, as indicated by an arrow X. When the valve assembly is maintained in its open position as shown in FIG. 1, substantial part of the inlet fluid will flow through ring passage 10e to outlet passage 10d, while at the same time a small quantity of the fluid will flow as a pilot flow into the narrow passage 24, thence through chamber 30, passages 27a–27b, bore 28 and passage 35 into a space in front of outlet opening 10d, whereby the pilot flow combines with the main flow.

A leakage flow will occur naturally through a considerable large play or clearance between the cylinder member 18 and the reduced portion 16a of the core chamber. This flow will finally reach the passage 27, but this effect will act only to increase the quantity of the pilot flow above described, so that no cause to adverse effect upon the proper functioning of the valve assembly results. On the contrary, the provision of the aforementioned relatively large play will contribute considerably to obtain the desirable smooth closing of the valve, as will be more fully described hereinafter.

When it is desired to close the valve, the control lever 36 is turned clockwise in FIG. 2 so as to separate the the free end thereof from the plunger 29, thereby releasing the latter. Whereupon, the plunger moves down under the influence of coil spring 42, until disc 38 resiliently seats upon seat 27c so as to close the related pilot passage 27b. In this way, the pilot flow is completely shut-off, so that the fluid back pressure acting upon the main valve member assembly from inside thereof will become predominant to overcome the main positive fluid pressure acting upon the outer surface of the piston. In this case, spring 25 acts as an auxiliary means for closing the main valve. In general, this auxiliary means may be dispensed with, thus relying solely upon the fluid pressure as above described.

In this way, the main valve will advance and finally occupy its closing position, wherein the resilient ring 23 cooperates with the seat 26. In this position, the main flow is completely shut-down. The valve constituents are so arranged and dimensioned that in the closing position of the valve, the resilient ring 47 will effectively seal the aforementioned considerable gap along the valve casing wall at 16a. The above-mentioned double sealing means comprising resilient rings 23 and 47 operates effectively to keep the main and leakage fluid streams completely shut-off.

The above-mentioned embodiment is of the manual reset type. When manual pressure is released from control handle 36 occupying its "off"-position, a returning spring 130 (FIG. 2) acts to rotate the handle clockwise in the same figure so as to bring the free end thereof into abutting engagement with the collar on plunger 29.

When the valve is to be re-opened, a manual switch (not shown) is closed so as to energize the solenoid coil 45 for attracting the plunger, and thus the latter is elevated thereby until it occupies the original position shown in FIG. 1. The outlet passage 27a–27b is thus opened to the main flow passage as before. In this way, the pilot flow is initiated and thus the fluid pressure prevailing in the valve chamber 30 is caused to reduce, whereby the fluid valve opening pressure acting upon the valve cone 19 will become predominant so that the counter fluid pressure plus spring pressure are overcome, whereby the main valve piston is displaced in the opening direction, that is, righthandwards in FIG. 1. The main fluid flow is then established as before and discharged from the discharge opening 10d as indicated by an arrow Y. The operator turns the control lever 36 clockwise in FIG. 2 to the position shown in the figure so as to engage with the plunger 29 underneath its collar. The pilot flow from inlet opening 10c through passage 24, chamber 30, passage 37, bore 28 and passage 35 to discharge opening 10d is thus continued. If necessary, spring 42 and solenoid 45 may be reversed in their action. More specifically, the solenoid may be designed and arranged for serving to close the pilot passage 35 with the coil spring 42 serving to return the plunger to its opening position.

If necessary, the aforementioned switch may be so arranged that it is controlled by the control lever 36. With such arrangement, one touch manipulation of lever 36 will produce the aforementioned valve opening or closing operation, as the case may be. It will be clear that with the embodiment described so far, wherein a considerable piston leakage clearance and an efficient double sealing mechanism are employed, the piston movement is carried out in a highly smooth manner so that the necessary pilot flow is amazingly small in its rate. With such an improved construction, the whole valve assembly can be made highly compact and the electrical energy for the control thereof will be small.

If necessary, the manual handle can be dispensed with and the valving operation may be controlled only by the solenoid coil, just as in conventional solenoid-operated valves.

It will be understood that as the piston advances, the pilot flow through the nozzle opening of the piston will be gradually reduced so as to provide an effective action thereupon. In this way, a disadvantageous fluid hammer effect may be practically overcome.

Effective buffering effect provided by the above explained arrangements, specifically shown FIGS. 4 and 5 can be clearly seen from a diagram shown in FIG. 6. Dotted line A–B–C represents a closing characteristic of the valve shown in FIG. 1. By the provision of the buffering means B described above in connection with FIG. 4, the closing characteristic can be modified and improved as shown by a curve A–B–C, which means that a sudden closing effect has been amazingly buffered. A similar valve to that shown in FIG. 1, having a large fluid capacity similar to a conventional 5″ valve, showed a closing characteristic curve A–D–E. By the provision of the needle type buffer described above in connection with FIG. 5, the curve was modified to line A–F–E, which represents again a remarkable improvement for avoiding a possible fluid hammer.

Although the above embodiments are adapted to be used for relatively low fluid pressure, for instance 5–200 p.s.i., the invention is not limited thereto. With a slight modification to the aforementioned embodiment, any fluid having a higher pressure such as for instance 2,000 p.s.i. can be equally treated. Although not shown, the lowermost end of plunger 29 may be fabricated to form a pointed end so as to cooperate with the uppermost end of passage 27b as a valve seat.

Without further analysis, the foregoing will so fully reveal the gist of the present invention that others can by applying current knowledge readily adapt it for various applications without omitting features that, from the stand of prior art, fairly constitute essential characteristics of the generic of specific aspects of this invention, and therefore, such adaptations should and are intended to be comprehended within the meaning and range of equivalence of the following claims.

What is claimed as new and desired to be secured by Letters Patent is:

1. In a pilot-operated valve assembly, the improvement comprising a valve body having a fluid inlet passage and a fluid discharge passage, a hollow piston slidably mounted in said body with a sufficient gap therebetween so as to cause said piston to assume a floating condition when fluid flows through said gap, said piston comprising a hollow cylindrical element having an enlarged flange portion and a cone as a forward extension of said element, a pilot fluid passage extending through said cone and said valve body and providing a flow path from said inlet passage, through said hollow cylindrical element to said fluid discharge passage, a solenoid-operated plunger for opening and closing the pilot flow passage at the downstream end thereof, a first sealing ring mounted on said hollow cylindrical element and butting said enlarged flange portion, a stationary support member provided in said fluid inlet passage, a buffer member movably mounted on said support and a resiliently urging means supported on said support member exerting upon said buffer member an urging force towards the inlet end of said pilot fluid passage, said buffer being adapted for providing a gradually increasing fluid buffering action upon said piston when the latter advances towards its closing position.

2. Pilot-operated valve assembly as set forth in claim 1, further comprising a sleeve rigidly mounted on said support member, said buffer member being in the form of a double headed slide made from a resilient material and said resiliently urging means being in the form of a coiled spring tensioned between said sleeve and one of said heads of said slide.

3. Pilot-operated valve assembly as set forth in claim 1, further comprising a sleeve rigidly mounted on said support member, said buffer member comprising a rigid pin mounted in said sleeve and having a gradually pointed end directing towards the inlet opening of said pilot flow passage.

No references cited.

M. CARY NELSON, *Primary Examiner.*

E. K. FEIN, *Examiner.*